United States Patent [19]
Coker et al.

[11] Patent Number: 5,619,539
[45] Date of Patent: Apr. 8, 1997

[54] DATA DETECTION METHODS AND APPARATUS FOR A DIRECT ACCESS STORAGE DEVICE

[75] Inventors: Jonathan D. Coker, Rochester, Minn.; Francois B. Dolivo, Wadenswil, Switzerland; Richard L. Galbraith, Rochester, Minn.; Reto J. Hermann, Buttikon; Walter Hirt, Zurich, both of Switzerland; Kevin Vannorsdel, San Jose, Calif.

[73] Assignee: International Business Machines Corporation, Armonk, N.Y.

[21] Appl. No.: 203,413

[22] Filed: Feb. 28, 1994

[51] Int. Cl.$^6$ .............................. H04L 5/02; H04L 27/06
[52] U.S. Cl. ............................ 375/341; 375/290; 360/51
[58] Field of Search ........................ 375/224, 262, 375/263, 290, 340–341; 370/13, 17; 371/43; 360/46, 51, 65

[56] References Cited

U.S. PATENT DOCUMENTS

| | | | |
|---|---|---|---|
| 4,609,907 | 9/1986 | Adler et al. | 341/59 |
| 4,707,681 | 11/1987 | Eggenberger et al. | 341/59 |
| 4,750,059 | 6/1988 | Syracuse | 360/48 |
| 4,786,890 | 11/1988 | Marcus et al. | 341/81 |
| 4,800,577 | 1/1989 | Tachika et al. | 375/340 |
| 4,881,241 | 11/1989 | Pommier et al. | 375/260 |
| 4,888,775 | 12/1989 | Karabed et al. | 371/43 |
| 4,888,779 | 12/1989 | Karabed et al. | 371/43 |
| 4,931,250 | 6/1990 | Greszczuk | 375/222 |

(List continued on next page.)

OTHER PUBLICATIONS

Bergmans et al, "On the Use of Decision Feedback for Simplifying the Viterbi Detector," Philips J. Res., vol. 42, No. 4, pp. 399–428, 1987.

Chevillat et al., "Decoding of Trellis–Encoded Signals in the Presence of Intersymbol Interference and Noise," IEEE Trans. Commun., vol. 37, No. 7, pp. 669–676, Jul. 1989.

Cideciyan et al., "A PRML System for Digital Magnetic Recording," IEEE J. Select. Areas Commun., vol. 10, No.1, pp. 38–56, Jan. 1992.

Coker et al., "Implementation of PRML in a Rigid Disk Drive," IEEE Trans. Magn., vol. 27, No. 6, pp. 4538–4543, Nov. 1991.

Dolivo, "Signal Processing for High–Density Digital Magnetic Recording," IBM Research Report, RZ 1798 (#64662) Mar. 3, 1989 Communications 14 pages.

Dolivo et al., "Performance and Sensitivity Analysis of Maximum–Likelihood Sequence Detection on Magnetic Recording Channels," IEEE Trans. Magn., vol. MAG–25, No. 5, pp. 4072–4074, Sep. 1989.

Duel–Hallen et al., "Delayed Decision–Feedback Sequence Estimation," IEEE Trans. Commun. vol. 37, No. 5, pp. 428–436, May 1989.

(List continued on next page.)

*Primary Examiner*—Young T. Tse
*Attorney, Agent, or Firm*—Joan Pennington

[57] ABSTRACT

A method and apparatus are provided for maximum-likelihood data detection in a partial-response (PR) data channel including a head and disk assembly providing an analog signal coupled to an analog to digital converter (ADC) providing digital samples. A plurality of digital samples are received from the ADC. The received digital samples are applied to a selected first filter and a selected second filter. The first filtered digital samples are applied to a first data detector, and the second filtered digital samples are applied to a second data detector. A predetermined parameter is identified, and at least one of the first and second data detectors is selected responsive to the identified predetermined parameter.

21 Claims, 12 Drawing Sheets

U.S. PATENT DOCUMENTS

| | | | |
|---|---|---|---|
| 4,945,538 | 7/1990 | Patel | 371/43 |
| 4,964,107 | 10/1990 | Galbraith et al. | 368/120 |
| 4,970,609 | 11/1990 | Cunningham et al. | 360/51 |
| 5,031,195 | 7/1991 | Chevillat et al. | 375/341 X |
| 5,095,484 | 3/1992 | Karabed et al. | 371/30 |
| 5,119,402 | 6/1992 | Ginzburg et al. | 375/288 |
| 5,196,849 | 3/1993 | Galbraith | 341/59 |
| 5,214,641 | 5/1993 | Chen et al. | 370/69.1 |
| 5,276,709 | 1/1994 | Kazawa et al. | 375/242 |
| 5,287,385 | 2/1994 | Sugawara et al. | 375/341 |
| 5,416,806 | 5/1995 | Coker et al. | 375/354 |
| 5,434,886 | 7/1995 | Kazawa et al. | 375/262 |
| 5,488,633 | 1/1996 | Laroia | 375/262 |
| 5,521,945 | 5/1996 | Knudson | 375/341 |

OTHER PUBLICATIONS

Eyuboglu et al., "Reduced–State Sequence Estimation with Set Partitioning and Decision Feedback," IEEE Trans. Commun., vol. 36, No. 1, Jan. 1988, pp. 13–20.

Fettweis et al., "Feedforward Architectures for Parallel Viterbi Decoding," J. VLSI Signal Processing, vol. 3, pp. 105–119, (Kluwer Academic Publ.) 1991.

Fetweiss et al., "High–Rate Viterbi Processor: A Systolic Array Solution," IEEE J. Select. Areas Commun., vol. 8, No. 8, pp. 1520–1534, Oct. 1990.

Fettweis et al., "Parallel Viterbi Algorithm Implementation: Breaking the ACS–Bottleneck," IEEE Trans. Commun., vol. 37, No. 8, pp. 785–790, Aug. 1989.

Forney, "Maximum–Likelihood Sequence Estimation of Digital Sequences in the Presence of Intersymbol Interference," IEEE Trans. Inform. Theory, vol. IT–18, No. 3, pp. 363–378, May 1972.

Furuya et al., "A Practical Approach Toward Maximum Likelihood Sequence Estimation for Band–Limited Nonlinear Channels," IEEE Trans. Commun. vol. COM–31, pp. 200–207, Feb. 1983, No. 2.

Futamoto et al., "Investigation of 2Gb/in$^2$ Magnetic Recording at a Track Density of 17kTPI," IEEE Trans. Magn., vol. 27, No. 6, pp. 5280–5285, Nov. 1991.

Howell et al., "Difference Metric Decoder for Interleaved Biphase Trellis Code," IBM Tech. Disc. Bull., vol. 31, No. 7, pp. 476–481, Dec. 1988.

Kabal et al., "Partial–Response Signaling," IEEE Trans. Commun., vol. COM–23, No. 9, pp. 921–934, Sep. 1975.

Kobayashi, "Application of Probabilistic Decoding to Digital Magnetic Recording Systems," IBM J. Res. Develop., pp. 64–74, Jan. 1971.

Kobayashi et al., "Application of Partial–Response Channel Coding to Magnetic Recording Systems," IBM J. Res. Develop., pp. 368–377, Jul. 1970.

Lender, "Correlative Level Coding for Binary–Data Transmission," IEEE Spectrum, pp. 104–114, Feb. 1966.

Newby et al., "High Density Digital Recording Using Videocassette Recorders," IEEE Trans. Magn., vol. MAG–19, No. 5, pp. 2245–2252, Sep. 1983.

Patel et al., "Class of Partial Response Systems for Increasing Storage Density in Magnetic Recording," IBM Tech. Disc. Bull., vol. 32, No. 3B, 339–340, Aug. 1989.

Shung et al., "VLSI Architectures for Metric Normalization in the Viterbi Algorithm," IEEE, pp. 1723–1728, 1990.

Sugawara et al., "Viterbi Detector Including PRML and EPRML," IEEE Trans. Magn., vol. 29, No. 6, pp. 4021–4023, Nov. 1993.

Thapar et al., "On the Performance of a Rate 8/10 Matched Spectral Null Code for Class–4 Partial Response," IEEE Trans. Magn., vol. 28, No. 5, pp. 2883–2888, Sep. 1992.

Truong et al., "A VLSI Design for a Trace–Back Viterbi Decoder," IEEE Trans. Commun., vol. 40, No. 3, pp. 616–624, Mar. 1992.

Ungerboeck, "Trellis–Coded Modulation with Redundant Signal Sets; Part 1: Introduction," IEEE Commun. Mag., vol. 25, No. 2, pp. 5–11, Feb. 1987.

A = 1/4 WITH $Y_K \equiv Y_K^{EPR4}$
AND C A REAL CONSTANT

DATA DETECTION METHODS AND APPARATUS FOR A DIRECT ACCESS STORAGE DEVICE

BACKGROUND OF THE INVENTION

1. Field of the Invention

The invention relates generally to data detection methods and apparatus, and more particularly to methods and apparatus for partial-response maximum-likelihood (PRML), extended partial-response maximum-likelihood (EPRML), and Viterbi data detection in a direct access storage device (DASD).

2. Description of the Prior Art

Partial-response signaling with maximum-likelihood sequence detection techniques are known for digital data communication and recording applications. Achievement of high-data density and high-data rates has resulted in the use of a PPML channel for writing and reading digital data on the disks.

Known commercial disk drives which include a PRML channel benefit from the fact that, with proper choice of the data rate, binary partial-response class-4 (PR4) signaling with maximum-likelihood sequence detection (MLSD) or PRML provides nearly optimal performance at the presently used linear recording densities. Typically magnetic recording channels operate with $0.8T/R < p_{w50} < 1.6T/R$ where T is the channel encoded bit period, R is the code rate and $p_{w50}$ is the width at the 50%-level of the channel's step response. For example, $p_{w50} = (\beta_{user}/(\pi R))T$ where $\beta$ user represents normalized user data rate and R is the code rate specific to each scheme, for example, such as, PRML advantageously uses R=8/9.

The performance loss of PRML with digital filter equalization caused by noise enhancement due to the equalizing filter becomes increasingly significant when the channel operates at linear recording densities such as $p_{w50} > 1.6T/R$. As a consequence, PMRL may fail to meet product specifications at greater linear recording densities.

To increase area storage density, mainly by means of increasing the linear density, requires that the PRML channel be replaced or complemented with a more powerful scheme in order to meet competitive product specifications. However, development and implementation of an entirely new channel architecture is a complex and costly task whose scope contradicts today's requirement for cost-effective and quick-to-market solutions.

U.S. Pat. No. 4,786,890 discloses a class-IV PRML channel using a run-length limited (RLL) code. The disclosed class-IV partial response channel polynomial equals $(1-D^2)$, where D is a one-bit interval delay operator and $D^2$ is a delay of two-bit interval delay operator and the channel response output waveform is described by taking the input waveform and subtracting from it the same waveform delayed by a two-bit interval. A (0,k=3/k1=5) PRML modulation code is utilized to encode 8 bit binary data into codewords comprised of 9 bit code sequences, where the maximum number k of consecutive zeroes allowed within a code sequence is 3 and the maximum number k1 of consecutive zeroes in the all-even or all-odd sequences is 5.

U.S. Pat. No. 5,196,849 discloses rate 8/9 block codes having maximum ones and run length constraints for use in a class-IV PRML channel.

Trellis coding techniques are used to provide a coding gain required in noisy or otherwise degraded channels. U.S. Pat. Nos. 4,888,775 and 4,888,779 describe trellis codes for PRML channels which provide significantly improved coding gains for transmission of digital data over PRML channels.

U.S. Pat. No. 4,609,907 discloses a method for bandwidth compression using partial response and run length limited coding. A first $1-D^2$ channel is used for detection of data with a 1+D channel for clocking.

A conventional EPRML channel design including extended (EPR4) equalization, timing and gain control represents a large jump in complexity as compared to a PRML channel. By conventional implementation methods, PRML and EPRML share very few common functional blocks. The conventional approach is considered unacceptable from a size, power and speed viewpoint. For EPRML, the calculations required for the 5-level gain and timing loops are more complex and slower. Also, the 5-level timing gradient calculation is considered to be less robust than the 3-level calculation for PRML. EPRML requires an 8-state non-interleaved Viterbi detector which by conventional implementation methods is not acceptable from a size, power and speed viewpoint. It is desirable to provide an EPRML implementation that allows for an acceptable size, cost and power to be achieved.

With a goal of increased linear density, it is desirable to implement an EPRML/PRML combination system to provide optimal performance over the entire disk radius.

SUMMARY OF THE INVENTION

It is a principal object of the present invention to provide data detection methods and apparatus for detecting data that overcomes many of the disadvantages of prior art arrangements.

In brief, the objects and advantages of the present invention are achieved by a method and apparatus for maximum-likelihood data detection in a partial-response (PR) data channel including a head and disk assembly providing an analog signal coupled to an analog to digital converter (ADC) providing digital samples. A plurality of digital samples are received from the ADC. The received digital samples are applied to a selected first filter and a selected second filter. The first filtered digital samples are applied to a first data detector, and the second filtered digital samples are applied to a second data detector. A predetermined parameter is identified, and at least one of the first and second data detectors is selected responsive to the identified predetermined parameter.

BRIEF DESCRIPTION OF THE DRAWINGS

The present invention, together with the above and other objects and advantages, can best be understood from the following detailed description of the embodiment of the invention illustrated in the drawings, wherein.

DETAILED DESCRIPTION OF THE PREFERRED EMBODIMENTS

Figure 1:
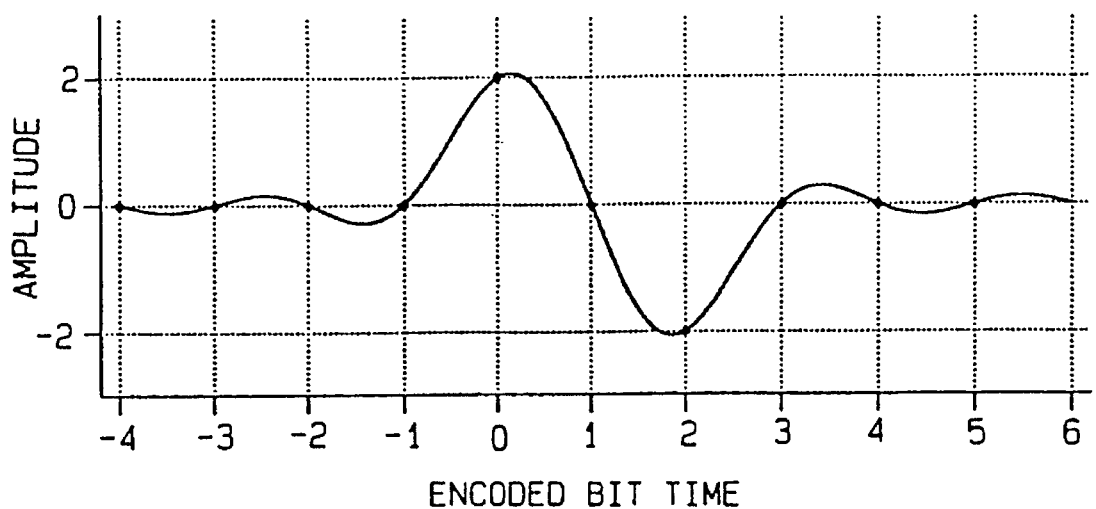
FIGS. 1 and 2 are graphs illustrating pulse responses for partial-response maximum-likelihood (PRML) channels based on partial response class-4 (PR4) and extended partial response class-4 (EPR4), respectively.
Figure 2:
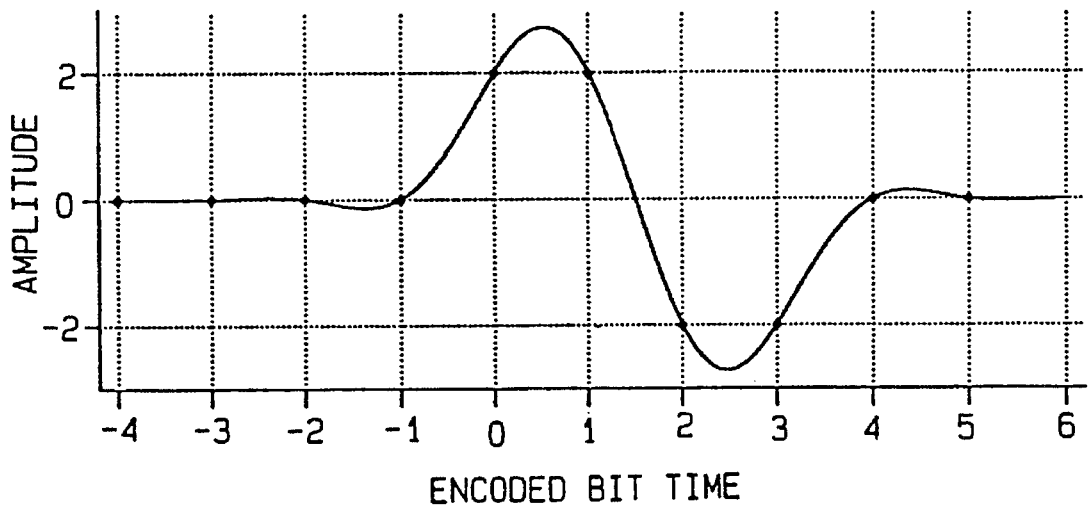

Referring now to FIGS. 1 and 2 of the drawing, there are shown graphs illustrating pulse responses for partial-response maximum-likelihood (PRML) channels based on partial response class-4 (PR4) and extended partial response class-4 (EPR4), respectively, assuming plus and minus one binary inputs. The system polynomial for PR4 is $(1-D^2)$. A natural extension of the PR4 response is the extended partial-response class-4 (EPR4) response which has a system polynomial of $(1-D^2)(1+D)=(1+D-D^2-D^3)$. FIGS. 1 and 2 illustrate the equalized readback waveforms for PR4 and EPR4 due to a 1-length write current pulse. Equalized EPR4 samples occur at five levels (+4, +2, 0, −2, −4) as compared to three levels (+2, 0, −2) for PR4. Maximum-likelihood detection can be applied to either of these partial-response systems.

In accordance with the invention, the correct choice for using EPR4 or PR4 depends on the magnetic design point. Only the detection method is changed for improved error rate performance. As shown in Table I, either EPR4 or PR4 is the optimal solution for a range of magnetic design points. This is illustrated by Table I where T is the channel encoded bit period, R is the Run-Length-Limited code rate, and $p_{w50}$ is the width at the 50%-level of the channel's step response.

TABLE I

| Channel Selection versus Signal Resolution | | |
|---|---|---|
| Channel Type | Code Rate R | Best Solution over this Range |
| Peak Detect (1,7) | ⅔ | $p_{w50} \leq 0.8T/R$ |
| PR4 (PRML) | 8/9 | $0.8T/R < p_{w50} \leq 1.6T/R$ |
| EPR4 (EPRML) | 8/9 | $1.6T/R < p_{w50}$ |

The EPRML/PRML combination system creates a new approach to maximizing both capacity and performance. By utilizing a PRML detection system towards the outer diameter (OD) of the disk and an EPRML system towards the inner diameter (ID) of the disk and maintaining the channel data rate at the maximum rate over the entire radius or slight zoned band recording (ZBR), it is possible to gain a significant capacity increase, for example, such as, approximately 15% while improving the overall data-rate performance of the file. This approach works because the detector type is matched to the channel magnetic design point, and thus the error-rate degrades less as the linear density is increased.

Preliminary experimental data has shown EPRML data detection to be less sensitive to ADC saturation, MR asymmetry, and uncompensated nonlinear bit shift as compared to PRML data detection. A significant performance/capacity increase is possible with the EPRML/PRML combination over what known ZBR systems have provided. ZBR provides increased capacity given the assumption that the channel error-rate always degrades as the linear density is increased. The capacity gain from ZBR always has the penalty of poorer sustained data-rate performance towards the ID of the disk.

Figure 3A:
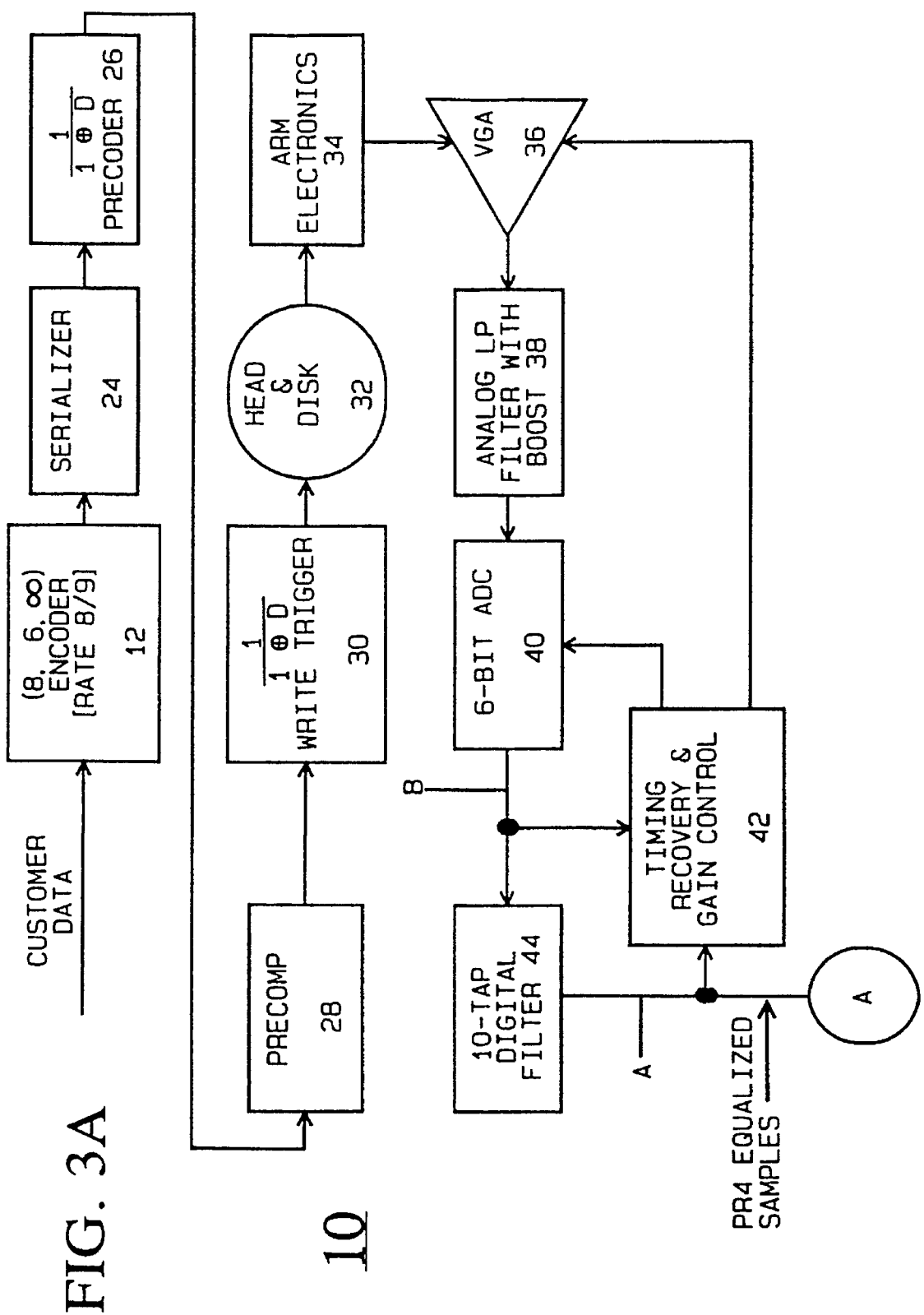
FIGS. 3A and 3B together provide a block diagram representation of a combination extended partial-response maximum-likelihood (EPRML) and PRML channel according to the invention.
Figure 3B:
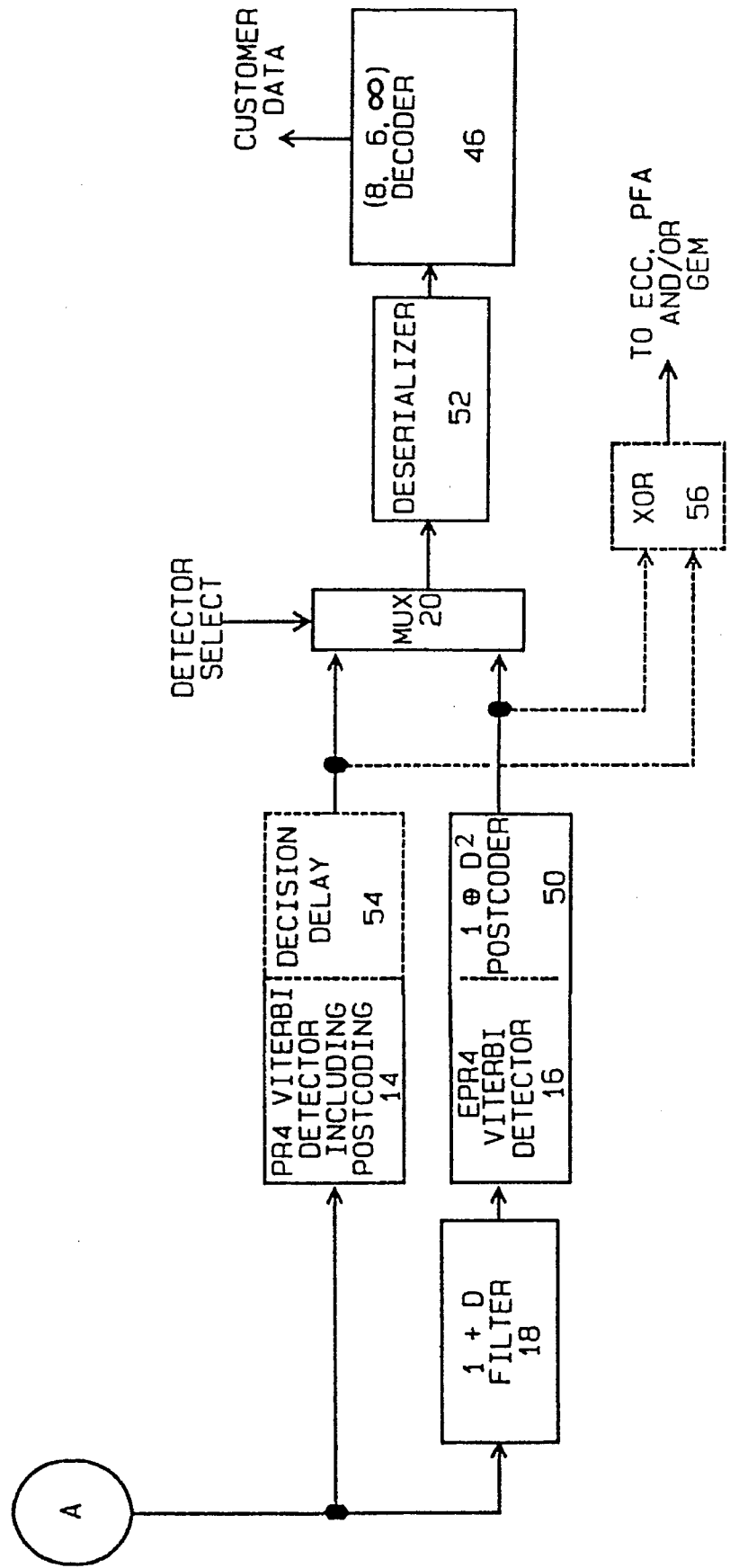

Referring now to FIGS. 3A and 3B, there is shown a block diagram of a combination of a partial-response maximum-likelihood (PRML) and extended partial-response maximum-likelihood (EPRML) data detection for a partial-response recording channel 10 in a direct access storage device in accordance with the invention. Customer data to be written, such as in the form of a binary symbol string, is applied to an encoder 12. Encoder 12 produces a modulated coded output having pre-defined run length constraints or codewords which serve as an input to a class-IV partial-response (PR) channel described by a $(1-D^2)$ operation. As shown, the present invention provides a novel architecture and implementation of EPR4 Viterbi detection (EPRML) in a PRML channel for improved data detection in high-density digital magnetic recording devices.

Referring also to FIG. 3B, the novel architecture of the invention allows a combination system of PRML and EPRML to share all functional blocks as shown in FIG. 3A with either a PR4 Viterbi detector 14 or an EPR4 Viterbi detector 16. This architecture allows for the addition of EPRML capability to a PRML channel by the inclusion of only a simple (1+D) digital adder or filter circuit 18, the EPR4 Viterbi detector 16 and a one-bit multiplexer 20 for selecting the output of the PR4 Viterbi detector 14 or the EPR4 Viterbi detector 16.

A serializer 24 and a precoder 26 follows the encoder 12. Precoder 26 is described by a 1/(1⊕D) operation where D is a unit delay operator and where ⊕ means modulo 2 addition. A PRML precomp 28 coupled to the precoder 26 provides a modulated binary pulse signal applied to a write trigger circuit 30 that provides the modulated write current for writing to the disk surface. Write trigger circuit 30 is described by 1/(1⊕D) operation. Precoder 26 in combination with write trigger circuit 30 together form a non-standard precoder $1/(1⊕D^2)$ for EPRML which has been proven to reduce the error event lengths and the number of Type I symbol errors as compared to the standard EPRML precoder.

An analog read signal is obtained at head and disk block 32. The read signal is applied via an arm electronics block 34 to a variable gain amplifier (VGA) 36. The amplified read signal is applied to a lowpass filter 38 that should preferably boost the higher frequencies to avoid saturation of an analog to digital converter (ADC) 40. The lowpass filtered read signal is converted to digital form by the ADC 40 that provides, for example, 64 possible 6-bit sampled values. Raw samples and noise are provided at a line labelled B at the output of the ADC 40.

The samples of the ADC 40 are applied to a timing recovery and gain control 42 and are applied to a digital filter 44, such as a 10-tap finite impulse response (FIR) digital filter. The timing recovery and gain control 42 provides a gain control signal to the VGA 36 and provides a timing control signal to the ADC 40. The EPRML/PRML combination system 10 uses common 3-level gain and timing loops for the PR4 equalized samples and noise provided at a line labelled A at the out-put of the digital filter 44. Gain and timing loops based upon the PR4 equalized samples are simpler and are considered more robust than 5-level loops for EPR4 samples.

PR4 equalized samples are transformed by the digital (1+D) adder or filter circuit 18 to obtain EPR4 5-level samples applied to the EPR4 Viterbi detector 16. The filtered signal from the digital filter 44 is applied to the PR4 Viterbi detector 14 and also is applied to the EPR4 Viterbi detector 16 via adder circuit 18. PR4 and EPR4 Viterbi detectors 14 and 16 are coupled to a decoder 46 to complete the maximum-likelihood (ML) detection process for data read back.

A postcoder 50 coupled to the EPR4 Viterbi detector 16 provides a $1 \oplus D^2$ operation. A deserializer 52 couples the selected detector output from the multiplexer 20 to the decoder 46. The use of EPRML or PRML data detection is software selectable and can be selected on a per-head, per-band optimization basis. Also, during a data recovery procedure (DRP), either detector 14 or 16 can be used for better recovery.

The EPRML/PRML combination uses a common $(8,6,\infty)$ 8/9 rate encoder 12 and $(8,6,\infty)$ 8/9 rate decoder 46. This code is compatible for both PRML and EPRML systems. The EPRML system, with the $(8,6,\infty)$ 8/9 rate code, generates a maximum of two adjacent codewords in error for all minimum distance error events. This property is equivalent to a PRML system using this code and thus typically the EPRML/PRML combination system does not have additional ECC requirements.

A PR4 channel applies three levels of coding to the binary data before it is written to the disk: 1) error correction coding (ECC); 2) run-length limited (RLL) coding; and 3) $1/(1 \oplus D^2)$ precoding. The latter is implemented in two $1/(1 \oplus D)$ stages of the precoder 26 and the write trigger 30 as shown in FIG. 3A. Here, precoding matches the PR4 signaling format and serves to simplify the design of the RLL code; also, precoding avoids data ambiguity with respect to readback signal polarity. A design criterion for the ECC is the length of the expected error bursts in the postcoded or inverse precoded data stream.

Two types of the so-called minimum (Euclidean) distance error events (MDEE's) govern the error burst behavior of the EPR4 Viterbi detector, Type-I and Type-II. Type-I determines the error burst behavior of the PR4 Viterbi detector. However, in conjunction with the $(8,6,\infty)$ constrained RLL code used in PR4, the longest Type-II error bursts are both shorter and less likely than the longest Type-I error bursts. In addition, non-standard precoding for EPRML has the advantage to reduce the number of symbol errors in the Type-I error bursts from 4 to 2.

With the given coding scheme used for the PR channel 10, in particular by making use of the PR4 precoding, the longest error burst with EPR4 Viterbi detection in the postcoded data stream (input of $(8,6,\infty)$) decoder 46 in FIG. 3B, caused by a Type-I MDEE, is 15 symbols long, with the first and last symbol in error; note that this is the same length as with PR4 Viterbi detection with detector 14. Furthermore, error bursts caused by Type-II MDEE's can be at most 12 symbols long, with the first two and the last two symbols in error. With a $(8,6,\infty)$ code, this implies that at most, two adjacent 9-bit codewords can be in error in case of an MDEE burst, independent of whether PR4 or EPR4 Viterbi detection is used.

The realization of EPR4 Viterbi detection requires the implementation of a survivor path memory (SPM) for eight states whose minimum finite depth is determined by the maximum expected length of the Type-I MDEE's. While twelve is the minimum number of required stages, additional stages, for example, fifteen, sixteen or seventeen stages can be used. Additional stages can provide improvements in error rate under noisy conditions. The symbol sequence to be estimated is the customer data in FIGS. 3A and 3B, while the generic Viterbi algorithm estimates the precoded data sequence. In principle, postcoding can be accomplished either embedded in the Viterbi detector or with explicit postcoding. Typically, embedded postcoding is implemented in the PR4 Viterbi detector in a PRML channel. Explicit postcoding is the preferred solution for the EPR4 Viterbi detector 16 for EPRML since it allows for the greatest overall savings in implementing the functions of SPM and postcoding.

This architecture allows for either the PR4 Viterbi detector 14 or the EPR4 Viterbi detector 16 to be de-powered or idle while the other is running in order to save power. Alternatively both Viterbi detectors 14 and 16 may be run simultaneously and compared to each other utilizing an exclusive-or (XOR) 56. This method advantageously could be in both on-the-fly data recovery procedures, for example, in connection with error correcting codes (ECC), predictive failure analysis (PFA) schemes, and also generalized error measurement (GEM) functionality.

An important feature of the integration method for EPR4 as shown in FIG. 3A is that the three functions of timing recovery, gain control and PR4 equalization are entirely decoupled from the function of data detection. No change in the data/signal path is made up to the output of the 10-tap digital filter 44.

The output of the 1+D adder or 1+D filter 18 delivers EPR4 like samples which are further processed by the 8-state EPR4 Viterbi detector 16. Explicit post-coding is applied to the bit stream obtained from the EPR4 Viterbi detector by the postcoder 50. When selected, the postcoded data stream is sent to the deserializer 52 via the 2-to-1 multiplexer (MUX) 20. Otherwise, the MUX 20 passes the output of the PR4 Viterbi detector 14 to the deserializer 52. Since the decision delay in the EPR4 detector 16 might be somewhat larger due to more pipelining, there exists the possibility to effectively synchronize the decision delay between the two detectors by introducing an appropriate delay block 54 in the PR4 Viterbi detector output. This optional delay 54 allows full on-the-fly diversity detection in case both detectors are powered-up continuously and operate in parallel. As indicated in FIG. 3B, the postcoded bit streams obtained from the PR4 Viterbi detector 14 and the EPR4 Viterbi detector 16 can be applied to the XOR function 56 whose output can be used to indicate to the ECC, PFA, and/or GEM circuitry when the two detectors disagree in their decisions.

If simultaneous operation of the two detectors is not desired, it is possible to power-down the detector not used; in this case the optional delay 54 in the PR4 detection path and the XOR function 56 are not required.

Figure 4:
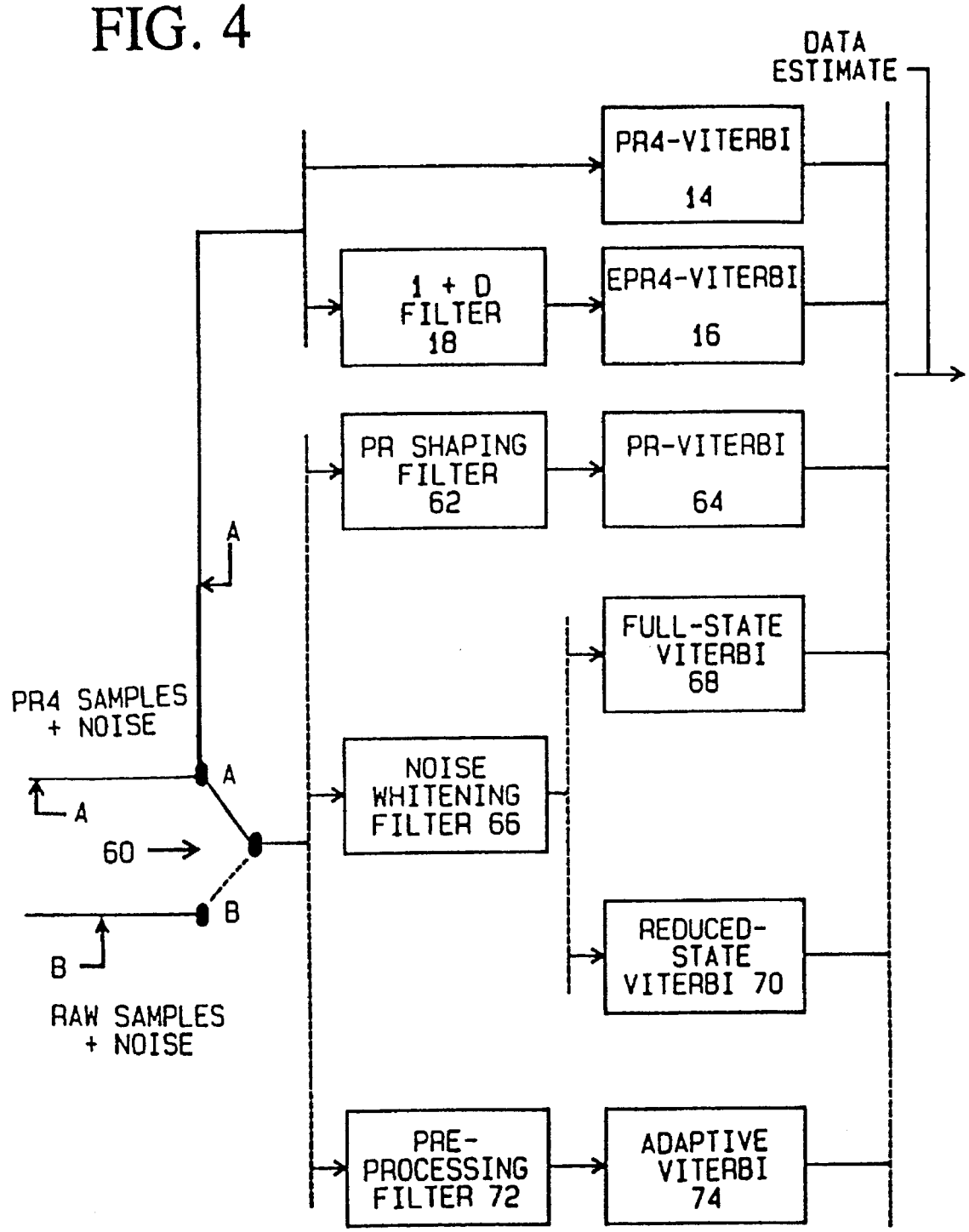
FIG. 4 is a block diagram representation of an alternative flexible channel architecture of the invention.

FIG. 4 illustrates a channel architecture enabling flexible integration of advanced methods for improved data detection in high-density digital magnetic recording devices. In FIG. 4, as shown at line A in FIG. 3A, the output of the digital filter 44 are PR4 samples which are corrupted by additive noise, for example, from the disk and electronic noise are applied to a selector 60. Alternatively, the raw samples and noise output of the ADC 40 at a line labelled B in FIG. 3A are applied to the selector 60. Note also in FIG. 3A that the positions of the analog lowpass filter 38 and the variable gain amplifier VGA 36 can be exchanged if necessary.

An important feature of the architecture shown in FIGS. 3A and 3B and 4 is that the three functions of timing recovery, gain control and PR4 equalization are entirely decoupled from the function of data detection. Depending on the selected data detection method in FIG. 4, one of the two options A or B may be more advantageous in terms of realizing the detector's preprocessing filter.

The PR4 Viterbi detector 14 operates directly on the PR4 samples provided by the digital filter 44, with no additional signal shaping being required beyond the digital filter output. The EPR4 (extended PR4) Viterbi detector 16 operates as an 8-state detector on the (noisy) EPR4 samples obtained at the output of the digital filter 18 with transfer polynomial 1+D, used with the noisy PR4 samples applied to its input. For channels with ($p_{w50}$>1.6T/R), significantly better performance can be obtained with this EPR4 data detection when compared with PRML.

For any suitable PR (partial-response) system, any PR shaping filter 62 can be used with a corresponding PR Viterbi detector 64. The PRML and EPRML data detection schemes can be generalized to higher-order PR systems, such as, EEPRML characterized by a polynomial of $(1-D^2)$ (1+D) (1+D), with data detection provided by the filter 62 and PR Viterbi detector 64. This method may be advantageous in case of very high, linear recording density. The input to the PR-shaping filter 62 can be either the raw, noisy samples obtained from the A/D converter with option B in FIG. 4 or the noisy PR4-equalized samples obtained at the output of the digital filter 44 with option A in FIG. 4.

As an alternative to the PR data detection methods described above, it is possible to use detectors derived from the optimal detection method which consists of a whitening or whitened matched filter (WMF) 66 followed by a corresponding Viterbi detector 68. In this method, the noise whitening filter 66 shown in FIG. 4, or an approximation thereof, introduces intersymbol interference (ISI) in return for no, or reduced, noise enhancement, respectively. The noise whitening filter 66 may only approximate the true WMF such that it introduces finite-length ISI. Assuming that the causal overall response measured at the output of the noise whitening filter 66 extends over N+1 bit intervals, then the full-state Viterbi detector 68 requires $2^N$ states. The input to the noise whitening filter 66 can be either the raw, noisy samples selected by option B or the noisy PR4-equalized samples selected by option A in FIG. 4.

Noise shaping filter 66 can implement a true WMF such that it introduces ISI of unbounded length or it may only approximate the WMF and introduce finite but still very long ISI. Then the causal overall response measured at the output of the noise shaping filter 66 has unbounded or excessive length, respectively, so that a suboptimal, reduced-state Viterbi detector 70 can be employed. A number of schemes using reduced-state Viterbi detection are known.

A pre-processing filter 72 can be used together with an adaptive Viterbi detector 74. An adaptive version of the maximum-likelihood estimator detector is used for the adaptive Viterbi detector 74. The input to the pre-processing filter 72 can be either the raw, noisy samples selected by option B or the noisy PR4-equalized samples selected by option A in FIG. 4. The basic idea in this data detection method is to continuously adapt a set of parameters, which determine the metric update equations in the Viterbi detector, as a function of the received signal samples by means of (tentative) detector decisions. For example, a general adaptive maximum-likelihood sequence detector (GAMLDS) 74 has the potential to compensate for signals suffering from any combination of nonlinear distortion, timing and gain offsets and misequalization.

Two or more of the detectors 14, 16, 64, 68, 70 and 74 can be implemented on a data detection chip so that a specific detector can be selected depending on the channel conditions and to implement detection diversity schemes for on-the-fly data recovery procedures and enhanced predictive failure analysis (PFA) schemes. The output of selected detectors 14, 16, 64, 68, 70 and 74 can be applied to the MUX 20 and the XOR 56 in FIG. 3B.

Figure 4A:
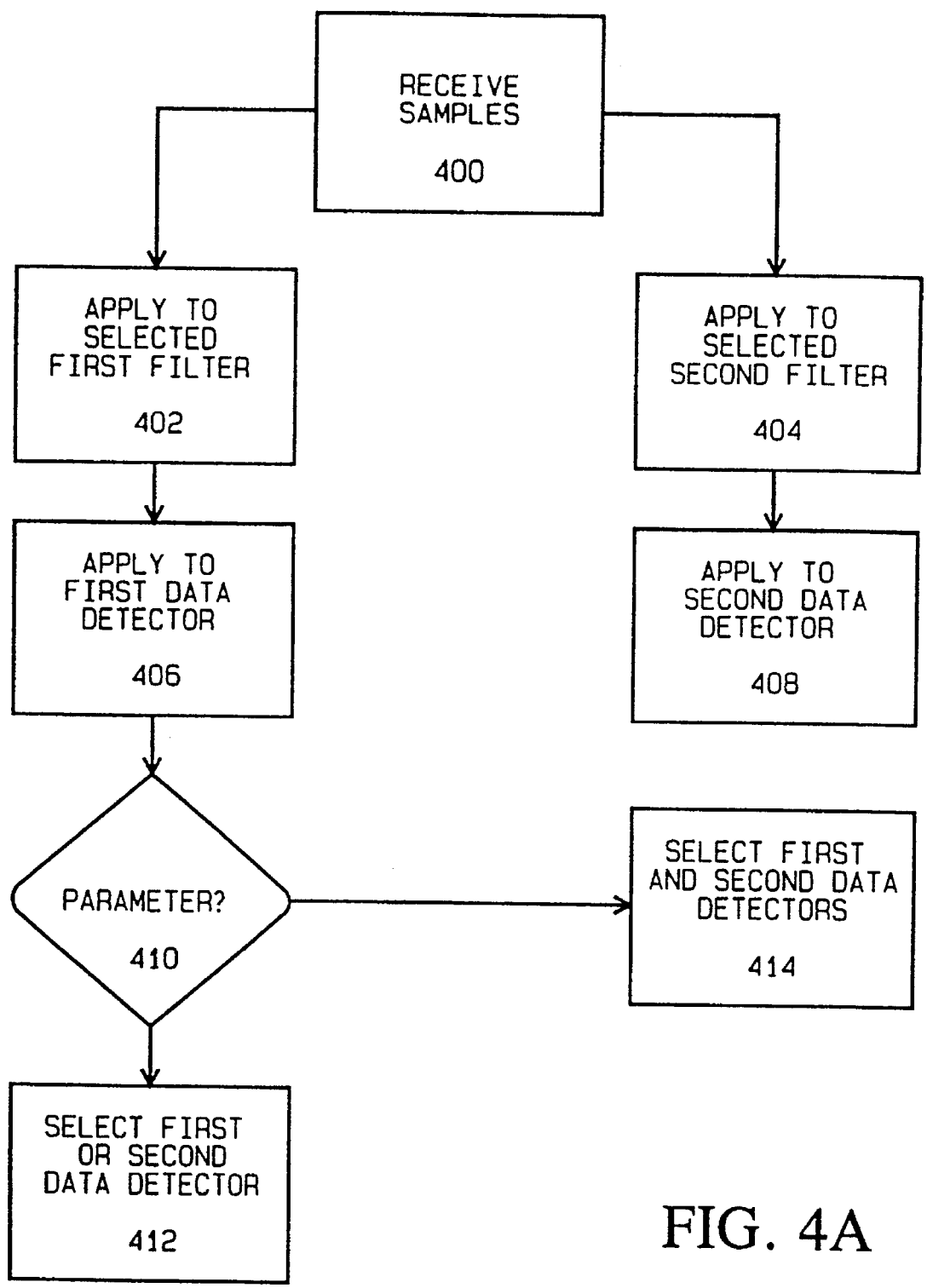
FIG. 4A is a flow chart illustrating sequential data detection steps in accordance with a data detection method of the invention.

FIG. 4A illustrates sequential data detection operations in accordance with the present invention. As indicated at a block 400, a plurality of digital samples are received from the ADC 40. The received digital samples are applied to a selected first filter indicated at a block 402, for example, such as, the digital filter 44 in FIG. 3A, or with option B selected by selector 60, to the PR shaping filter 62, the noise whitening filter 66 and the pre-processing filter 72 in FIG. 4. With option A selected with selector 60, the filtered PR4 digital samples from the output of the digital filter 44 in FIG. 3A are applied to a selected second filter indicated at a block 404, for example, such as, to the 1+D filter 18, the PR shaping filter 62, the noise whitening filter 66 and/or the pre-processing filter 72 in FIG. 4. The first filtered digital samples are applied to a first data detector indicated at a block 406, such as the PR4 Viterbi detector 14 or EPR4 Viterbi detector 16 and the second filtered digital samples are applied to a second data detector indicated at a block 408, such as the EPR4 Viterbi detector 16, the full-state Viterbi detector 68, the reduced state Viterbi detector 70 or the adaptive Viterbi detector 74. A predetermined parameter is identified at a decision block 410, such as listed in Table I. One of the first and second data detectors is selected responsive to the identified predetermined parameter as indicated at a block 412, such as to select the PR4 Viterbi detector 14 or the EPR4 Viterbi detector 16 with the detector select input to MUX 20. Alternatively, both the first and second data detectors are selected responsive to the identified predetermined parameter as indicated at a block 414, such as by using the XOR 56 in FIG. 3B or by selecting two or more of the detectors 14, 16, 64, 68, 70 and 74 using selector 60 in FIG. 4.

Figure 5A:
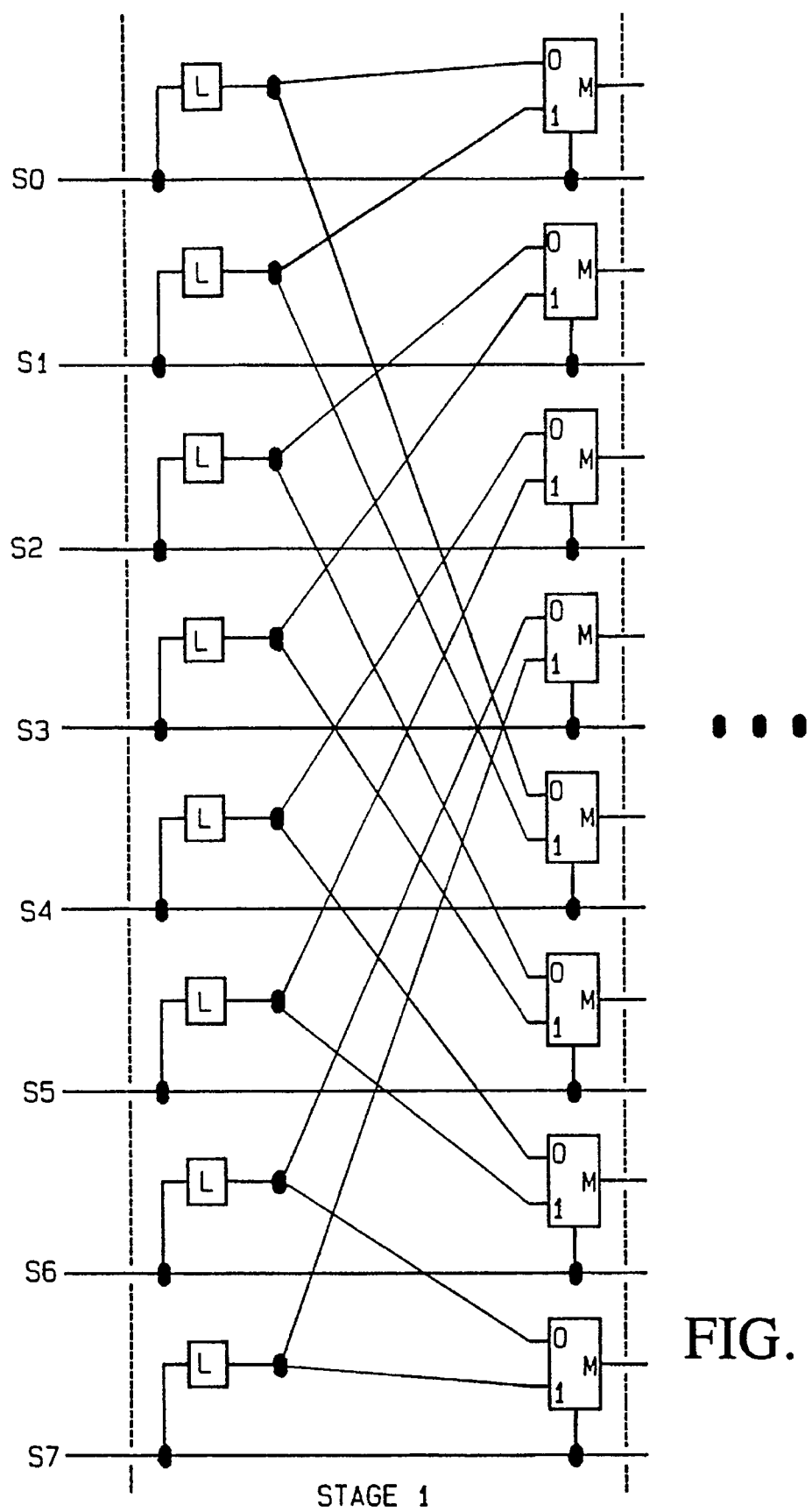
FIGS. 5A and 5B together form a schematic diagram illustrating a survivor path memory for an EPR4 Viterbi detector arrangement.
Figure 5B:
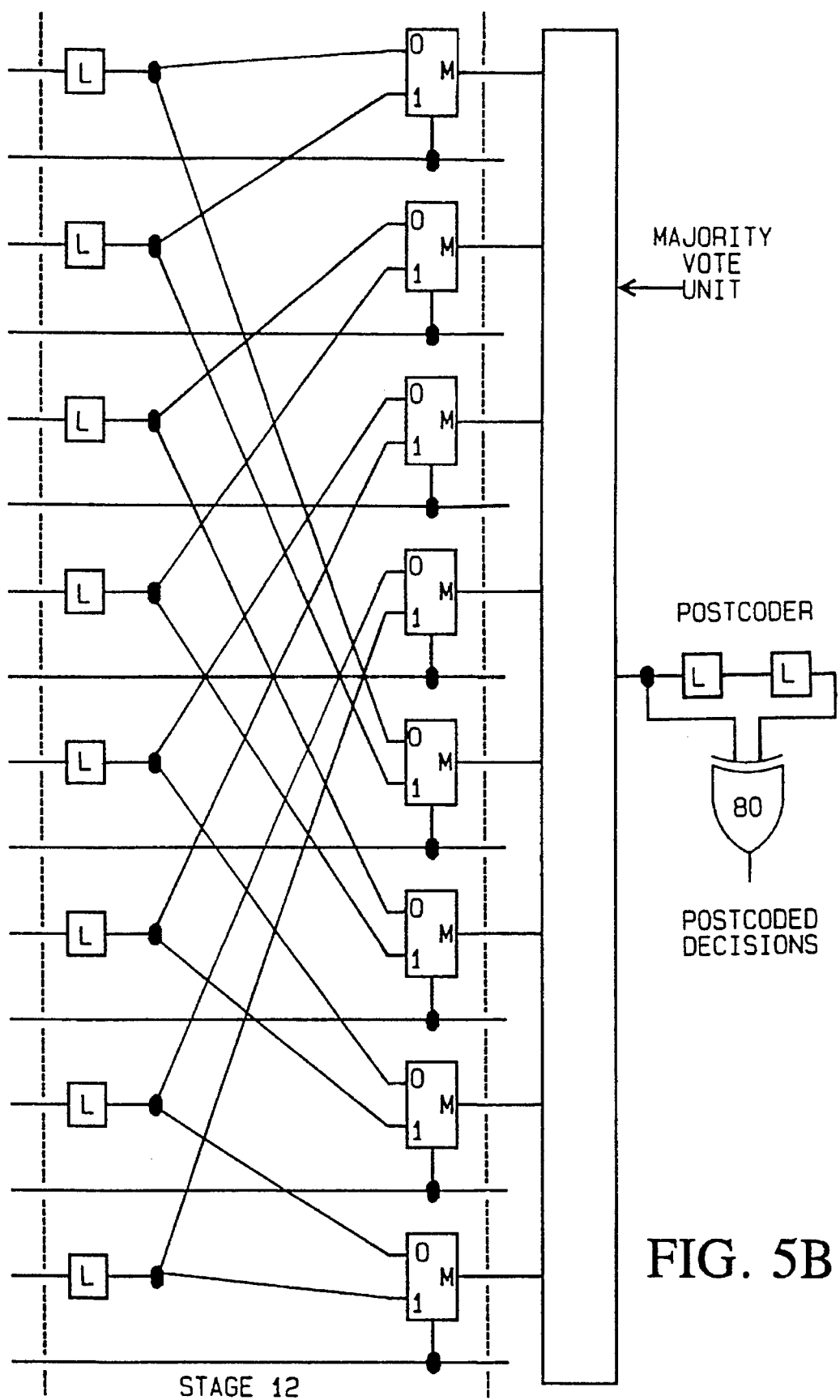

FIGS. 5A and 5B together show the principle form of implementation for the EPR4 survivor path memory SPM with a MAJORITY VOTE UNIT and a postcoder. The SPM in the form of a register-exchange implementation is the preferred method for high-speed EPRML applications. The select signals labelled S0, S1, S2, S3, S4, S5, S6 and S7 are applied to a corresponding one of eight latches or latch blocks labelled L and are driving a select input of each of eight multiplexers labelled M in each memory path. The select signals S0, S1, S2, S3, S4, S5, S6 and S7 are generated by the add-compare-select (ACS) unit illustrated and described with respect to FIG. 8. By making use of trellis state information, last state bits are used to reduce the minimum required path memory length from 15 to 12. In principle this allows both PRML and EPRML to have identical path memory lengths. Each of the stages of the SPM includes a column of latches L and a column of multiplexers as shown in FIG. 5A in stage #1 and in FIG. 5B for stage #12. With explicit postcoding provided by postcoder 50 in FIG. 3B, the depth of the survivor path memory is at least 12 symbols to avoid systematic errors, in conjunction with the exemplary (8,6,∞) code used in the preferred implementation. The final decisions are obtained by a MAJORITY VOTE UNIT coupled to the MUX outputs on the last available symbol in the path for each of the eight states in stage #12. Compared to the optimal final decision, which would be obtained from the most likely path, the majority decisions are insignificantly suboptimal because ideally, all paths have merged at the last stage. In general the final decision can be obtained by different means, for example, by picking any one of the last decisions (called wedge decisions). Generated majority decisions are applied to a postcoder connected to the output of the MAJORITY VOTE UNIT. The postcoder including a pair of latches and an exclusive-or 80, provides the postcoded decisions.

For the realization of the EPR4 Viterbi detector 16, a novel, modified metric function is provided. It can be shown that for channels with a spectral null at DC or zero frequency, as is the case for EPR4, MLSD is equivalent to minimizing a modified metric function. For EPR4, this minimzed modified metric represented by J* takes the form $$J^* = \min_{\{a_k'\}} \sum_k [y_k^{EPR4} + C - x_k'(\{a_k'\})]^2 \quad (1)$$

where the $y_k^{EPR4}$ are EPR4 samples corrupted with additive noise, C is a real constant and $x_k'(\{a_k'\})$ are the hypothesized, noise-free channel output samples given by $$x_k'(\{a_k'\}) = a_k' + a_{k-1}' - a_{k-2}' - a_{k-3}', \; a_i' \in \{-1, +1\}. \quad (2)$$

Expanding the square in (1), dropping the term $(y_k^{EPR4} + C)^2$ from the minimization since it does not depend on the hypothesized data sequence $\{a_k'\}$, the minimization for MLSD can be reformulated as $$J^* = \min_{\{a_k'\}} \sum_k \delta_k(\{a_k'\}) \quad (3)$$

where $$\delta_k(\{a_k'\}) = A(-2x_k'(\{a_k'\})(y_k^{EPR4} + C) + (x_k'(\{a_k'\}))^2) \quad (4)$$

with A being a convenient scaling factor. The novel, modified metric minimization defined by (3) and (4) is the basis for the design of the EPR4 Viterbi detector illustrated and described with respect to FIGS. 5A, 5B, 6, 7, 8 and 9.

Figure 6:
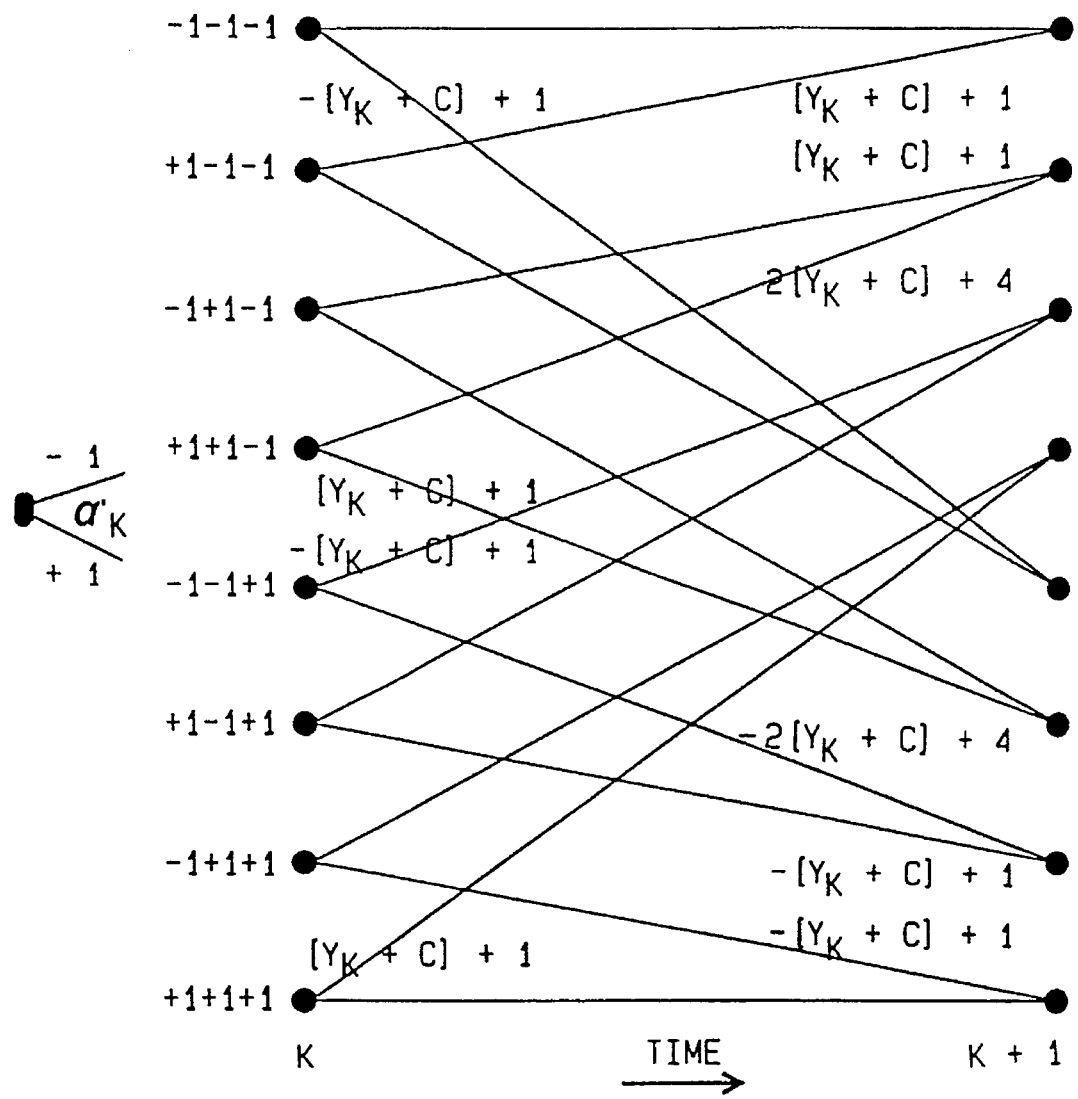
FIG. 6 is an eight state EPR4 trellis transition diagram using modified metric computation with A=¼, $Y_K=Y_K^{EPR4}$ and C equal to a real constant.

Table II shows the modified branch metrics obtained from using (2) in (4) where $y_k^{EPR4} = x_k^{EPR4} + n_k$ are the corrupted EPR4 signal samples with $n_k$ being noise samples; $s_k'$ and $s_{k+1}'$ are present and next state, respectively. The trellis corresponding to Table II is shown in FIG. 6 where we have used $A = \frac{1}{4}$.

TABLE II

Modified Branch Metrics for EPR4

| $a_{k-3}', a_{k-2}', a_{k-1}'$ | $a_k'$ | $x_k'$ | $\delta_k/K$ | $s_k'$ | $s_{k+1}'$ |
|---|---|---|---|---|---|
| −1 −1 −1 | −1 | 0 | 0 | 0 | 0 |
| −1 −1 −1 | +1 | +2 | $-(y_K^{EPR4} + C) + 1$ | 0 | 4 |
| +1 −1 −1 | −1 | −2 | $+(y_K^{EPR4} + C) + 1$ | 1 | 0 |
| +1 −1 −1 | +1 | 0 | 0 | 1 | 4 |
| −1 +1 −1 | −1 | −2 | $+(y_K^{EPR4} + C) + 1$ | 2 | 1 |
| −1 +1 −1 | +1 | 0 | 0 | 2 | 5 |
| +1 +1 −1 | −1 | −4 | $+2(y_K^{EPR4} + C) + 4$ | 3 | 1 |
| +1 +1 −1 | +1 | −2 | $+(y_K^{EPR4} + C) + 1$ | 3 | 5 |
| −1 −1 +1 | −1 | +2 | $-(y_K^{EPR4} + C) + 1$ | 4 | 2 |
| −1 −1 +1 | +1 | +4 | $-2(y_K^{EPR4} + C) + 4$ | 4 | 6 |
| +1 −1 +1 | −1 | 0 | 0 | 5 | 2 |
| +1 −1 +1 | +1 | +2 | $-(y_K^{EPR4} + C) + 1$ | 5 | 6 |
| −1 +1 +1 | −1 | 0 | 0 | 6 | 3 |
| −1 +1 +1 | +1 | +2 | $-(y_K^{EPR4} + C) + 1$ | 6 | 7 |
| +1 +1 +1 | −1 | −2 | $+(y_K^{EPR4} + C) + 1$ | 7 | 3 |
| +1 +1 +1 | +1 | 0 | 0 | 7 | 7 |

The trellis in FIG. 6 can be transformed by shifting the modified branch metrics appropriately across nodes under use of the relation $$\min((u+c), (v+c)) = \min(u,v) + c \quad (5)$$

which holds similarly for maximization. Depending on the criteria to be optimized, for example, for a minimum number of operations or highest possible speed with a given technology, a variety of alternate trellis transformations can be obtained to suit the particular purposes.

Figure 7:
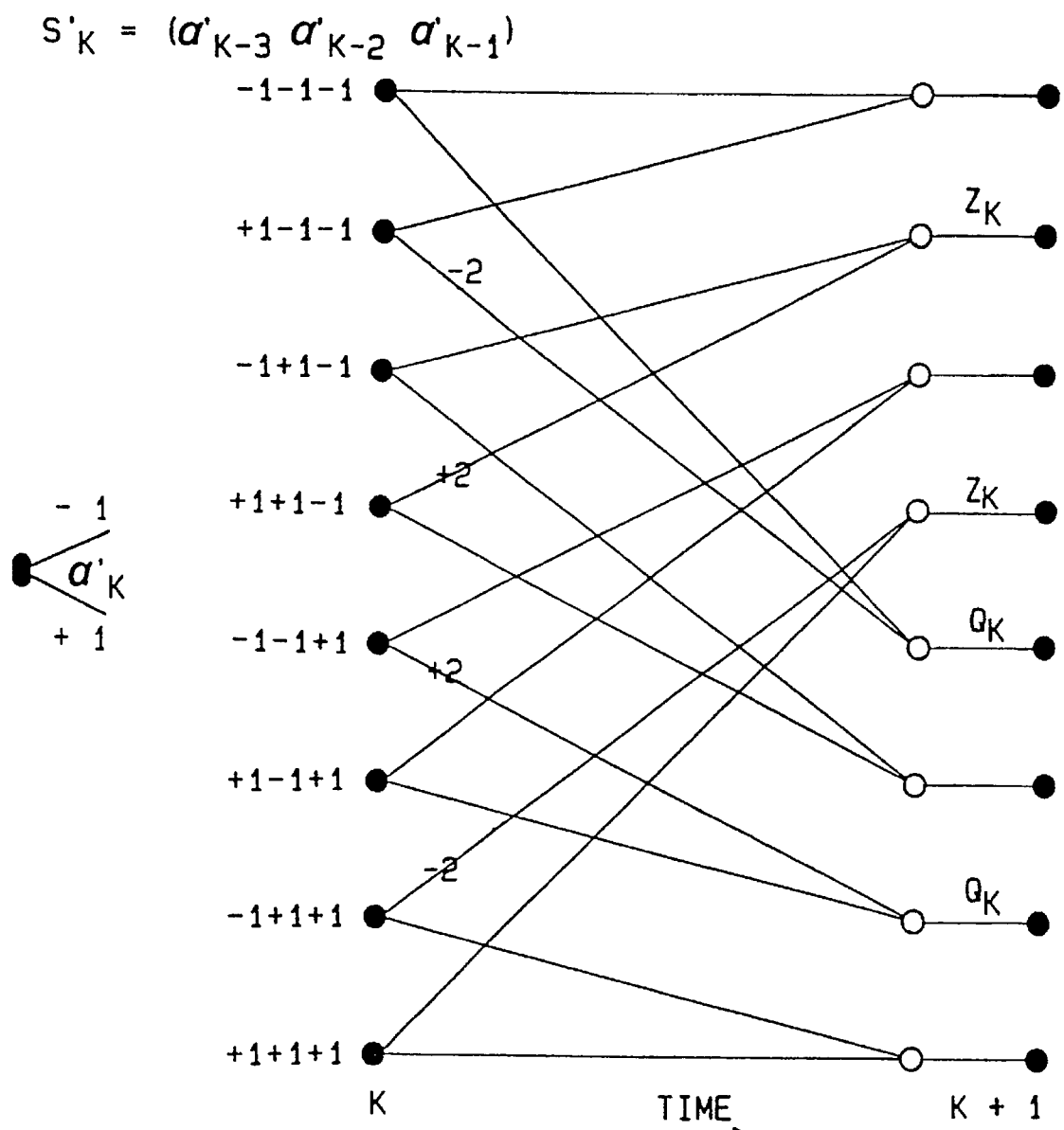
FIG. 7 is a transformed eight state EPR4 trellis transition diagram using modified metric computation with A=¼ and C=−1.

FIG. 7 shows a transformed trellis as compared with the trellis of FIG. 6, where the quantities appearing in the branch metrics represented by $Z_k$ and $Q_k$ are now computed in terms of received PR4 samples as $$Z_k = y_{k+1}^{PR4} + 2y_k^{PR4} + Y_{k-1}^{PR4} \quad (6a)$$

and $$Q_k = -Z_k + 4, \quad (6b)$$

respectively, and where we have used $C = -1$. Here, introduction of the nonzero constant C in the modified metric expression (1) has eliminated the need for adding the constant +2 to $Z_k$ which would be necessary in the conventional case with $C = 0$. Also, addition of a constant 4 instead of 2 in equation 6b is simpler to implement. Note that any constant can be added to $Z_k$ if necessary to ease implementation. An actual very large scale integrated (VLSI) design can make use of this property to ease implementation of offset binary arithmetic. To reflect the EPRML detector 16, the received EPR4 samples $y_k^{EPR4}$ have been expressed in terms of received PR4 samples, i.e. $y_k^{EPR4} = y_k^{PR4} + y_{k-1}^{PR4}$, PR4 when deriving (6a).

FIG. 7 illustrates a new modified metric technique to decrease the number of additions required to implement a EPRML detector and also makes some of the remaining adders easier to implement.

Figure 8:
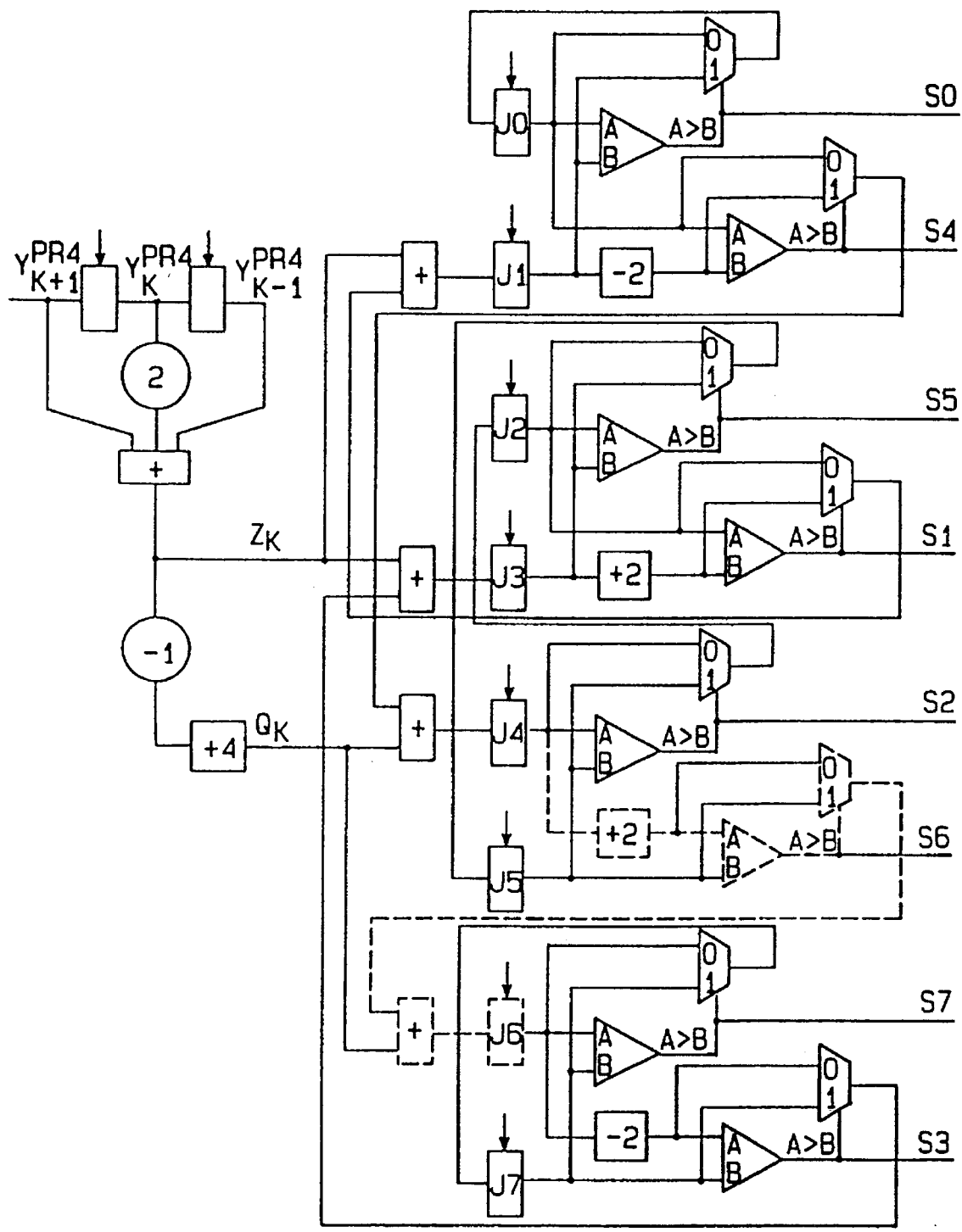
FIG. 8 is a schematic diagram illustrating add, compare and select (ACS) calculation circuitry for an EPR4 Viterbi detector derived directly from the trellis of FIG. 7 according to the invention.

FIG. 8 illustrates a novel implementation for the EPRML Viterbi detector 16 that allows for reduced size, power, and increased speed. Metric bounding is accomplished by a known modulus metric addition technique. FIG. 8 shows the add-compare-select (ACS) unit derived directly from the trellis shown in FIG. 7 with the corresponding survivor path memory shown in FIG. 5. Eight, eight-bit registers J0–J7 represent the metrics corresponding to the dots in the trellis shown in FIG. 7. Each J register is coupled to an A>B comparison and a selection 2-to-1 multiplexer. An adder block labelled + provides the addition of the $Z_K$ and $Q_K$ terms as shown in FIG. 7. The dashed part in FIG. 8 indicates a typical worst-case-delay path consisting of a constant addition, a comparison (equivalent to an addition), a selection (2-to-1 multiplexer), a further addition and a latching operation. Thus, while the transformed trellis of FIG. 7 is minimal in terms of the number of quantities to compute and operations to perform, it is not practical in situations where the VLSI technology allows execution of at most one full addition (or comparison) and one multiplexing operation per clock cycle.

Figure 9:
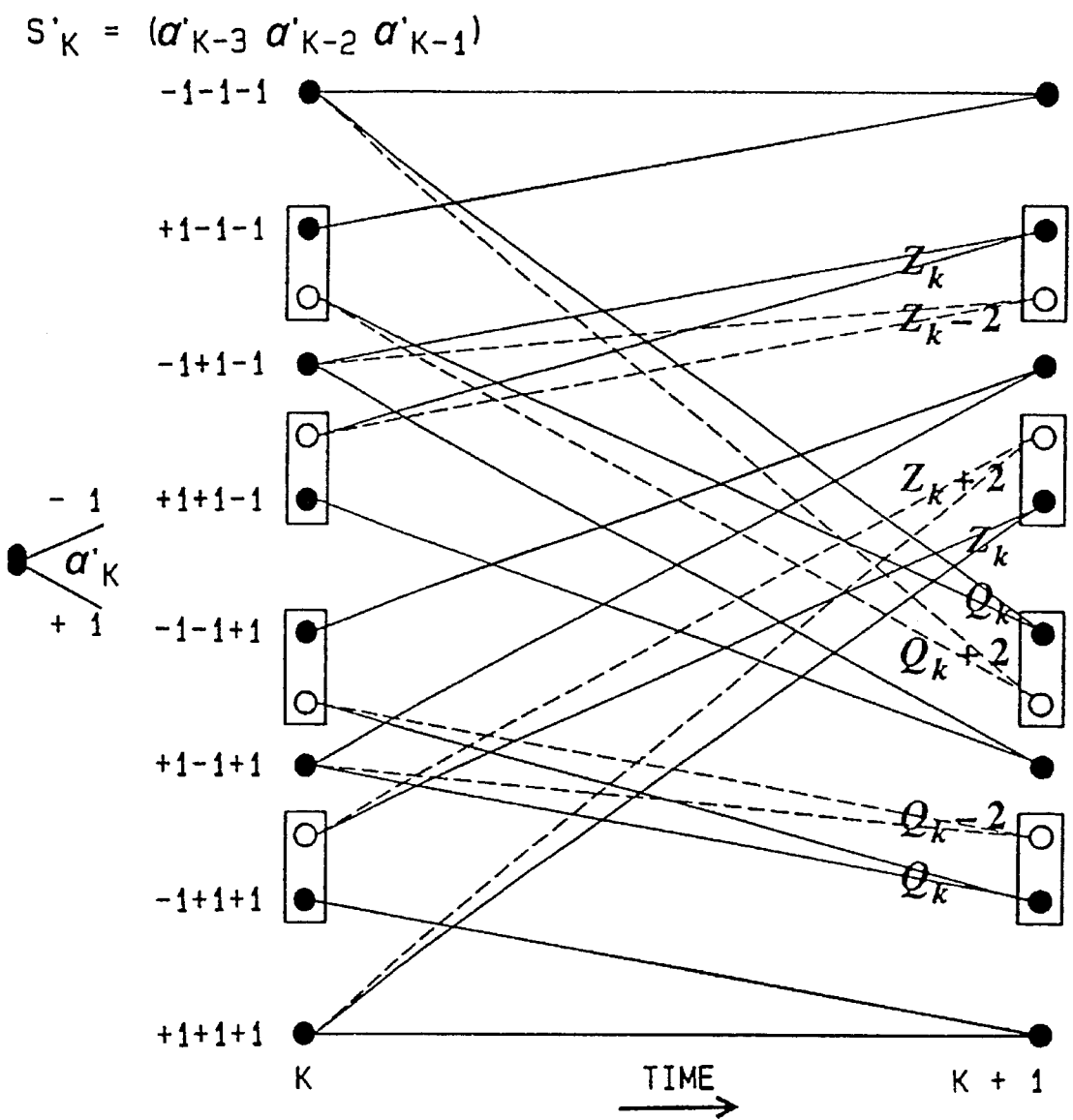
FIG. 9 is a second alternative, transformed and expanded EPR4 trellis transition diagram enabling high-speed implementation.

FIG. 9 illustrates a new state splitting technique that provides a way to reduce the computation that must be done in a single clock cycle. The speed problem is solved by further transforming the trellis of FIG. 7 by introducing a state-splitting technique as follows. Firstly, the states for all nonzero branch metrics are split. Secondly, those state transitions or branches labelled with nonzero branch metrics are rearranged such that all leaving transitions from a given split state have the same branch metric. Thirdly, the above relation (5) is applied twice. This procedure provides the expanded trellis structure shown in FIG. 9 where the additional nodes shown by an open circle can be considered to be pseudo states with associated metrics. Thus, trading speed with complexity in this way results in an expanded EPR4 trellis which is better suited for high-speed implementation. A VLSI circuit implementation preferably is directly based on this expanded EPR4 trellis of FIG. 9.

If a faster VLSI technology becomes available, some of the transformation steps which led to the expanded trellis in FIG. 9 can be reverted in order to reduce complexity. Ideally, the trellis of FIG. 7 would be directly implemented.

Furthermore, note from (6b) that $Q_k + Z_k = 4$. Simulation studies have shown that it can be advantageous in terms of error rate performance if the constant 4 in equation 6b is replaced by a smaller number, for example, such as, 3.75. Thus, (6b) can be optionally modified such that $$Q_k + Z_k = 4 - \alpha, \; 0 \leq \alpha <, \quad (7)$$

where a practical value for $\alpha$ is 0.25.

Figure 10:
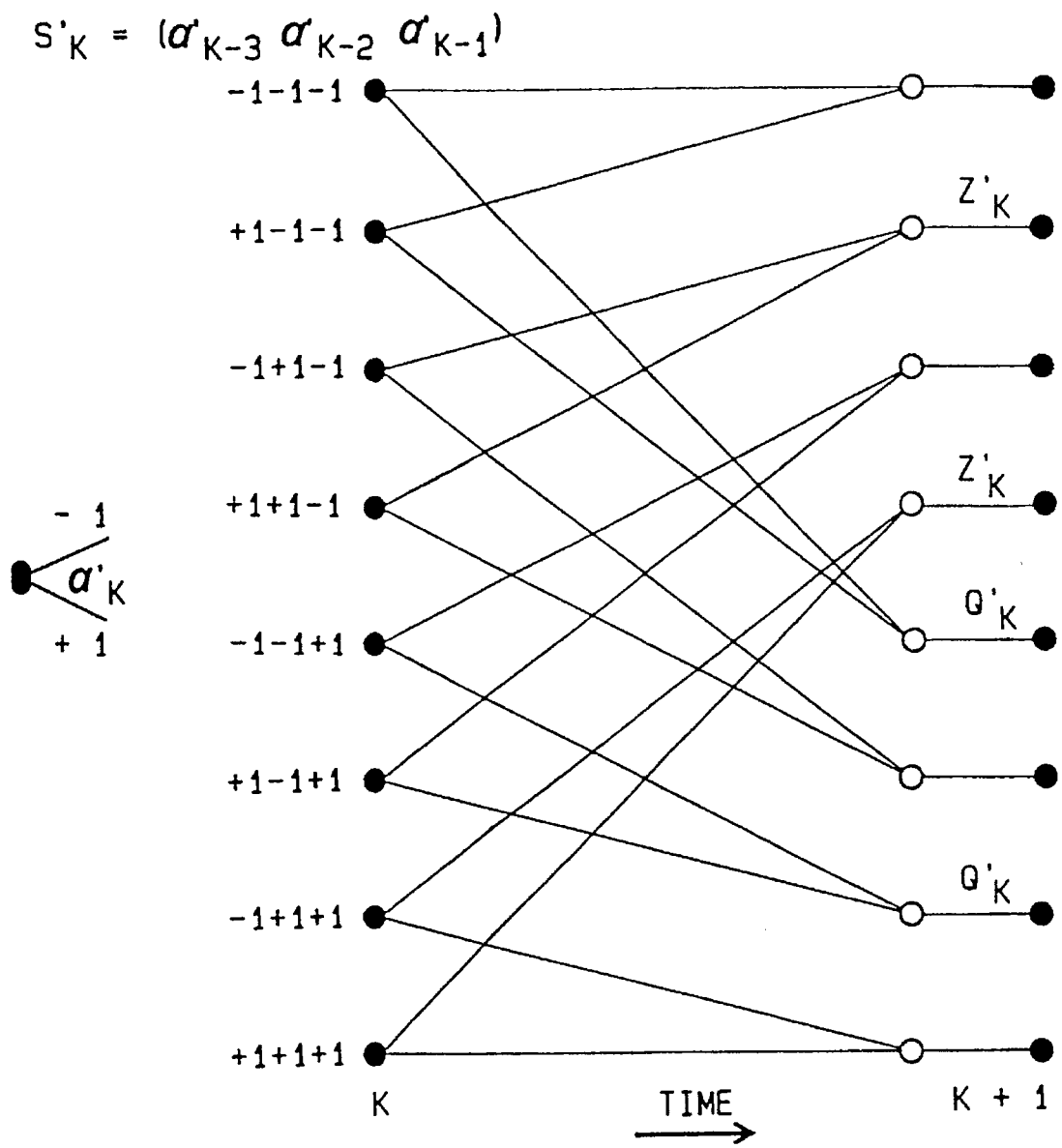
FIG. 10 illustrates the EPR4 trellis transition diagram of FIG. 7 transformed as a PR4 detector.

FIG. 10 illustrates the EPR4 trellis transition diagram of FIG. 7 transformed to provide a PR4 detector. In the transformed trellis of FIG. 10, the branch metrics represented by $Z'_k$ and $Q'_k$ are computed in terms of received PR4 samples as $$Z'_k = Y_k^{PR4} \tag{8a}$$

and $$Q'_k = -Z'_k + 2. \tag{8b}$$

The EPRML detector of FIG. 8 can be modified to provide a PRML detector corresponding to the trellis shown in FIG. 10. The same SPM for the EPRML detector is used for the PRML detector with only the trellis changed. It should be understood that the transformed trellis of FIG. 10 is not the preferred implementation of a PRML detector if built alone.

While the invention has been described with reference to details of the illustrated embodiments, these details are not intended to limit the scope of the invention as defined in the appended claims.

We claim:

1. A method for maximum-likelihood data detection in a direct access storage device including a partial-response (PR) data channel including a head and disk assembly providing an analog signal coupled to an analog to digital converter (ADC) providing digital samples, said method comprising the steps of:

receiving a plurality of digital samples from the ADC;

applying the received digital samples to a first digital filter for providing class-IV partial response (PR4) samples;

applying the filtered PR4 digital samples to a second digital 1+D filter for providing extended Class IV partial response (EPR4) samples;

applying the filtered PR4 digital samples to a first data detector;

applying the filtered EPR4 digital samples to a second data detector;

identifying a predetermined parameter responsive to the received digital samples; and selecting at least one of the first and second data detectors responsive to the identified predetermined parameter.

2. A method as recited in claim 1 wherein the step of applying the filtered PR4 digital samples to the first data detector includes the step of applying the filtered PR4 digital samples to a PR4 Viterbi detector.

3. A method as recited in claim 1 wherein the step of applying the filtered EPR4 digital samples to the second data detector includes the step of applying the filtered EPR4 digital samples to an EPR4 Viterbi detector.

4. A method for maximum-likelihood data detection in a direct access storage device including a partial-response (PR) data channel including a head and disk assembly providing an analog signal coupled to an analog to digital converter (ADC) providing digital samples, said method comprising the steps of:

receiving a plurality of digital samples from the ADC;

applying the received digital samples to a partial response (PR) shaping filter for providing PR digital samples;

applying the received digital samples to a selected second filter;

applying the filtered PR digital samples to a first data detector;

applying the second filtered digital samples to a second data detector;

identifying a predetermined parameter responsive to the received digital samples; and selecting at least one of the first and second data detectors responsive to the identified predetermined parameter.

5. A method as recited in claim 4 wherein the step of applying the filtered PR digital samples to the first data detector includes the step of applying the filtered PR digital samples to a PR Viterbi detector.

6. A method for maximum-likelihood data detection in a direct access storage device including a partial-response (PR) data channel including a head and disk assembly providing an analog signal coupled to an analog to digital converter (ADC) providing digital samples, said method comprising the steps of:

receiving a plurality of digital samples from the ADC;

applying the received digital samples to a noise whitening filter for providing noise whitening digital samples;

applying the received digital samples to a selected second filter;

applying the filtered noise whitening digital samples to a first data detector;

applying the second filtered digital samples to a second data detector;

identifying a predetermined parameter responsive to the received digital samples; and selecting at least one of the first and second data detectors responsive to the identified predetermined parameter.

7. A method as recited in claim 6 wherein the step of applying the filtered noise whitening digital samples to the first data detector includes the step of applying the filtered noise whitening digital samples to a full-state Viterbi detector.

8. A method as recited in claim 6 wherein the step of applying the filtered noise whitening digital samples to the first data detector includes the step of applying the filtered noise whitening digital samples to a reduced state Viterbi detector.

9. A method for maximum-likelihood data detection in a direct access storage device including a partial-response (PR) data channel including a head and disk assembly providing an analog signal coupled to an analog to digital converter (ADC) providing digital samples, said method comprising the steps of:

receiving a plurality of digital samples from the ADC;

applying the received digital samples to a pre-processing filter for providing pre-processing digital samples;

applying the received digital samples to a selected second filter;

applying the filtered pre-processing digital samples to a first data detector;

applying the second filtered digital samples to a second data detector;

identifying a predetermined parameter responsive to the received digital samples; and selecting at least one of the first and second data detectors responsive to the identified predetermined parameter.

10. A method as recited in claim 9 wherein the step of applying the filtered pre-processing digital samples to said first data detector includes the step of applying the filtered preprocessing digital samples to an adaptive Viterbi detector.

11. A method for maximum-likelihood data detection in a direct access storage device including a partial-response (PR) data channel including a head and disk assembly providing an analog signal coupled to an analog to digital converter (ADC) providing digital samples, said method comprising the steps of:

receiving a plurality of digital samples from the ADC;

applying the received digital samples to a selected first filter;

applying the received digital samples to a selected second filter;

applying the first filtered digital samples to a first data detector;

applying the second filtered digital samples to a second data detector; wherein said first data detector and said second data detector include an extended partial-response maximum-likelihood (EPRML) data detector and a partial response maximum-likelihood (PRML) data detector;

identifying a predetermined parameter; the identified predetermined parameter including at least a zone of a disk and a head and radius combination; and selecting at least one of said extended partial response maximum-likelihood (EPRML) data detector and said partial response maximum-likelihood (PRML) data detector responsive to each identified head and radius combination.

12. A method as recited in claim 11 wherein the step of identifying the predetermined parameter includes the step of identifying a signal resolution.

13. Apparatus for data detection in a direct access storage device including a digital data channel including a head and disk assembly providing an analog signal coupled to an analog to digital converter (ADC) providing digital samples, said apparatus comprising:

a first filter coupled to the ADC for receiving and filtering a plurality of digital samples from the ADC;

a second filter coupled to the ADC for receiving and filtering a plurality of digital samples from the ADC;

an extended class-IV partial response (EPR4) Viterbi detector coupled to the first filter for receiving the first filtered samples;

a data detector coupled to the second filter for receiving the second filtered samples;

means for identifying a predetermined parameter responsive to the received digital samples; and means for selecting at least one of the EPR4 Viterbi detector and the data detector responsive to the identified predetermined parameter.

14. Apparatus for data detection in a direct access storage device including a digital data channel including a head and disk assembly providing an analog signal coupled to an analog to digital converter (ADC) providing digital samples, said apparatus comprising:

a first filter coupled to the ADC for receiving and filtering a plurality of digital samples from the ADC;

a second filter coupled to the first filter for receiving and filtering a plurality of digital samples from the first filter;

a partial response class-IV (PR4) Viterbi detector coupled to the first filter for receiving the first filtered samples;

a data detector coupled to the second filter for receiving the second filtered samples;

means for identifying a predetermined parameter responsive to the received digital samples from the ADC; and means for selecting at least one of the PR4 Viterbi detector and the data detector responsive to the identified predetermined parameter.

15. Apparatus as recited in claim 14 wherein the data detector includes an extended class-IV partial response (EPR4) Viterbi detector.

16. Apparatus as recited in claim 14 wherein the data detector includes a partial response Viterbi detector.

17. Apparatus as recited in claim 14 wherein the data detector includes an adaptive Viterbi detector.

18. Apparatus as recited in claim 14 wherein the data detector includes a full-state Viterbi detector.

19. Apparatus as recited in claim 14 wherein the data detector includes a reduced-state Viterbi detector.

20. Apparatus as recited in claim 14 wherein the data detector includes an extended class-IV partial response (EPR4) Viterbi detector implementation of a modified metric function J* is represented by $$J^* = \min_{\{a_k'\}} \sum_k \delta_k(\{a_k'\})$$

where $\delta_k(\{a'_k\}) = A(-2x'k(\{a'k\})\ (y_k^{EPR4}+C)+(x'_k(\{a'_k\}))2)$; and where A is a scaling factor and where the $y_k^{EPR4}$ are extended class IV partial response (EPR4) samples corrupted with additive noise, C is a real constant and $x'_k(\{a'_k\})$ are the hypothesized, noise-free channel output samples given by $x'_k(\{a'_k\})=a'_k+a'_{k-1}-a'_{k-2}-a'_{k-3}$, $a'_i \in \{-1,+1\ \}$.

21. Apparatus as recited in claim 20 wherein branch metrics $Z_k$ and $Q_k$ are represented in terms of received class IV partial response (PR4) samples as $Z_k = y_{k+1}^{PR4} + 2y_k^{PR4} + Y_{k-1}^{PR4}$ and $Q_k = -Z_k + (4-\alpha)$, where $0 \leq \alpha < 1$, $C = -1$ and $y_k^{EPR4} y_k^{PR4} + y_{k-1}^{PR4}$.

* * * * *